Figure 1:
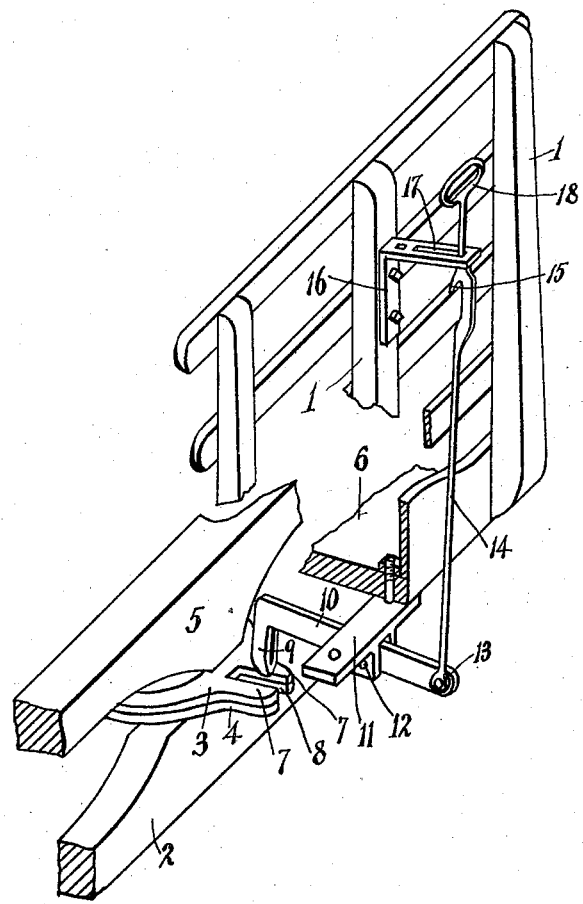

(No Model.)

C. W. ROBINSON.
LOCK FOR FIFTH WHEELS OF WAGONS.

No. 585,788. Patented July 6, 1897.

WITNESSES:

INVENTOR
Charles W Robinson
BY
ATTORNEY

UNITED STATES PATENT OFFICE.

CHARLES W. ROBINSON, OF SAGINAW, MICHIGAN.

LOCK FOR FIFTH-WHEELS OF WAGONS.

SPECIFICATION forming part of Letters Patent No. 585,788, dated July 6, 1897.

Application filed May 28, 1896. Serial No. 593,482. (No model.)

*To all whom it may concern:*

Be it known that I, CHARLES W. ROBINSON, a citizen of the United States, residing at Saginaw, in the county of Saginaw and State of Michigan, have invented a certain new and useful Lock for Fifth-Wheels of Wagons; and I do declare the following to be a full, clear, and exact description of the invention, such as will enable others skilled in the art to which it appertains to make and use the same, reference being had to the accompanying drawing, and to the figures of reference marked thereon, which forms a part of this specification.

My invention relates to wagons, and is a device for the purpose of locking what is commonly known as the "fifth-wheel" of the wagon, and thereby preventing the throwing of the wagon-tongue from side to side as the wheel of the front truck strikes an obstruction or drops into a hole in the road.

It is a well-known fact that the lateral movement of the wagon-tongue caused by the movement of the wagon over a rough road-bed materially interferes with the management of the team connected with the wagon and prevents their drawing as heavy a load, for the reason that the horses are afraid of being struck by the tongue, which it often does, sometimes to the injury of the horse and at other times frightening them and causing a runaway and great damage. It is also well known that when one of the front wheels of a loaded vehicle strikes an obstruction the wheel is stopped, the opposite wheel going forward. The wheel engaging the obstruction is then forced to mount the obstruction obliquely, thus placing great lateral strain upon the periphery of the wheel, which often results in the destruction of the wheel or badly damaging it. It also requires far more draft to cause the wheel to mount the obstruction than it would if the wheel was held to a rigid position. There is also a great lateral strain upon the wheel as it descends from the obstruction, it being thrown forward and descends obliquely or at an angle to the obstruction. Many devices have been invented for the purpose of lessening this movement of the tongue, but I am not aware that any device has heretofore been made locking the fifth-wheel, and thereby preventing the front axle from turning on the king-bolt or other equivalent device. The device illustrated is but one of many different ways in which the wheel or axle may be locked, and the means for operating the device shown may also be varied, the means shown being adapted for use upon what is known as a "truck" and operated from the top of the front of the truck. It will also be apparent that this device or a similar device can be made and connected so as to be operated automatically by the strain which the horses impart to the pole.

The figure is a perspective, in part sectional, of the front end of a truck provided with my invention.

1 is the frame of the front end of the truck.

2 is the axle, and 3 and 4 are the fifth-wheel plates. 7 is a lug thrown out on the front of these plates, having the slot 8 in each in line.

5 is the bolster of the truck, over which the floor 6 of the truck is placed.

10 is a lever pivoted by the pin 12 underneath the front end of the truck between the depending lugs of the plate 11, secured underneath the front of the truck and having on its inner end the depending lug 9, adapted to fit into the slot 8 in the lugs 7 and engage them, and thereby prevent the movement of the fifth-wheel plates 3 and 4 one upon the other.

14 is a rod extending up the front of the truck and hinged to the outer end of the lever 10 by the pin 13. Its upper end passes through a guide-slot 17 in the plate 16, secured to the front of the truck, and on the upper end of the rod 14 is a hook 15, adapted to engage the plate 16 and hold the device in the locked position.

18 is a handle-loop in the upper end of the rod for operating. As heretofore stated, it is apparent that this is but one of many ways that might be devised for locking the fifth-wheel, and therefore I do not wish to confine myself to the particular device shown, but broadly claim any means for locking the fifth-wheel for accomplishing the purpose mentioned.

Having thus described my invention, what I claim as new, and desire to secure by Letters Patent, is—

1. In a wagon, a key pivoted under the wagon and independent of the gearing, and adapted to be actuated into a socket in the upper and lower layers of the fifth-wheel and thereby prevent the layers from moving one upon the other, as specified.

2. In a wagon, means for locking the fifth-wheel of a wagon and thereby preventing the lateral movement of the wagon-tongue, comprising a bolt adapted to be passed between two lugs extending from each of the upper and lower layers of the fifth-wheel, and means for actuating the bolt, substantially as specified.

3. In a wagon, the combination with a lever extending upward from the front of the wagon and within reach of the driver, a pivoted bar connected to the lever and actuated by it, a key connected to the opposite end of the lever, and sockets in the upper and lower layers of the fifth-wheel adapted to receive the key when the lever is actuated and thereby lock the axle and bolster, substantially as specified.

In witness whereof I hereunto affix my signature in the presence of two witnesses.

CHARLES W. ROBINSON.

Witnesses:
A. H. SWARTHOUT,
FANNIE ROBBINS.